July 4, 1967  P. B. SWAN ET AL  3,329,282
GARMENT RACK AND MERCHANDISER
Filed Aug. 19, 1965  4 Sheets-Sheet 2

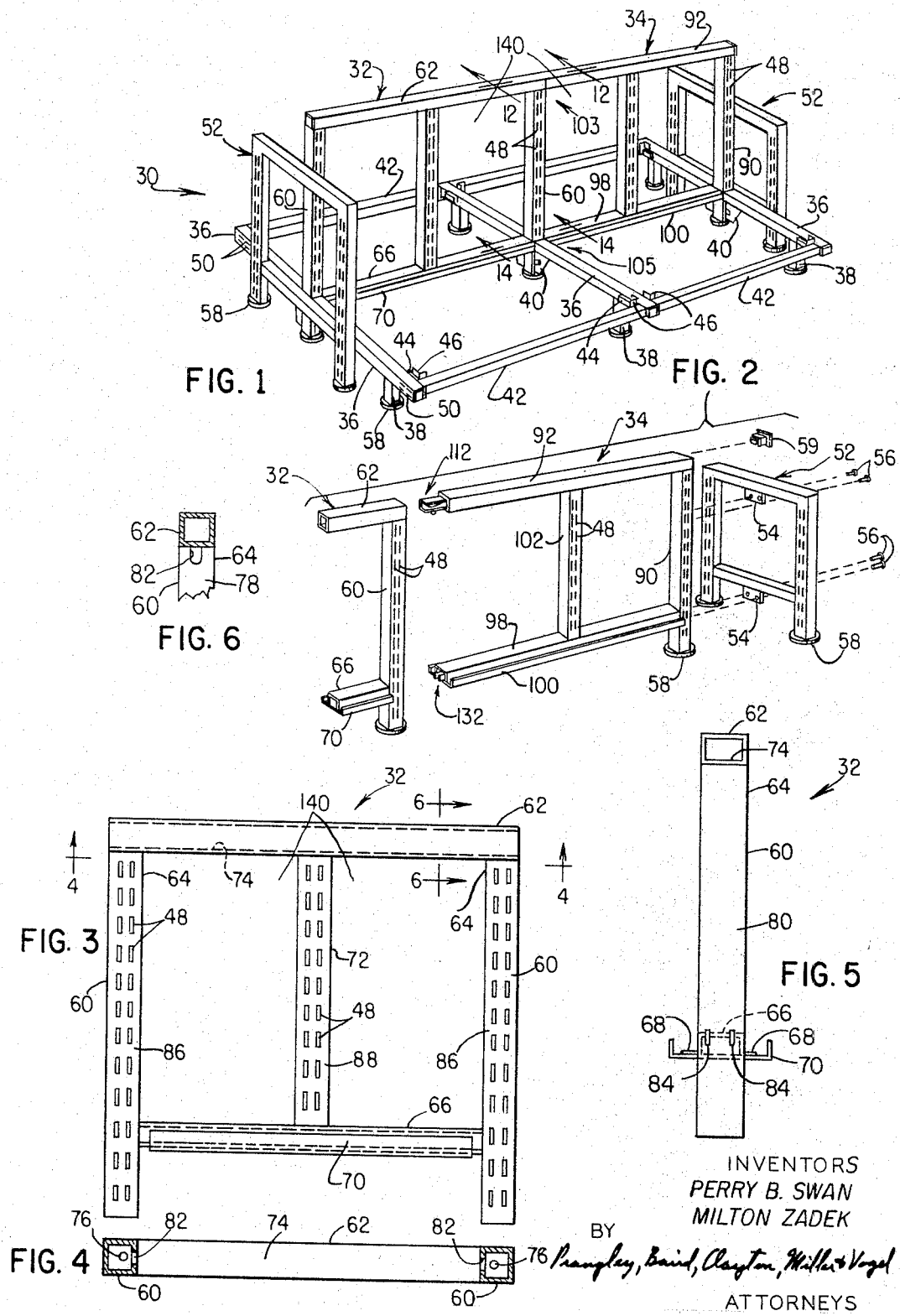

INVENTORS
PERRY B. SWAN
MILTON ZADEK
BY
Pendleby, Baird, Clayton, Miller & Vogel
ATTORNEYS

INVENTORS
PERRY B. SWAN
MILTON ZADEK
BY
ATTORNEYS

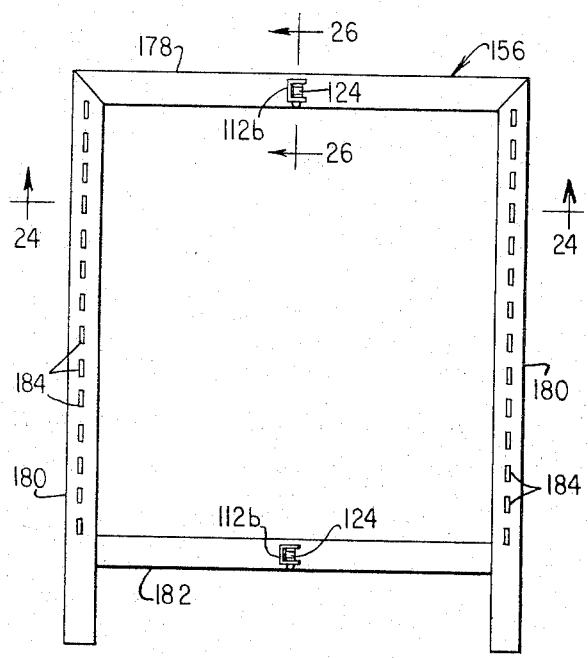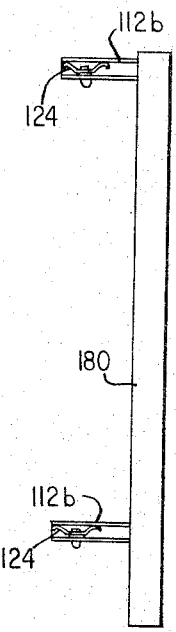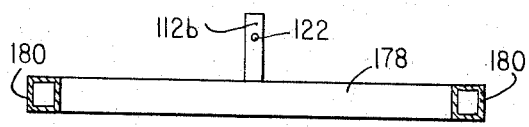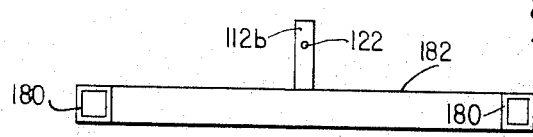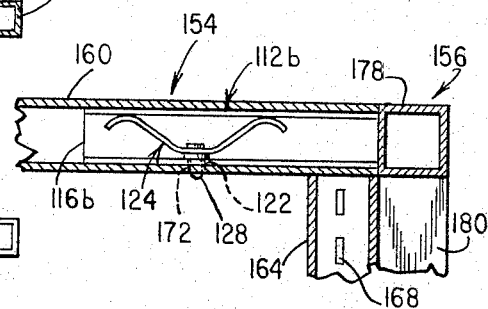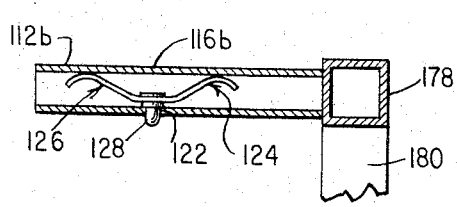
INVENTORS
PERRY B. SWAN
MILTON ZADEK
ATTORNEYS

United States Patent Office 3,329,282
Patented July 4, 1967

3,329,282
GARMENT RACK AND MERCHANDISER
Perry B. Swan, Chicago, and Milton Zadek, Highland Park, Ill., assignors to Reflector Hardware Corporation, Melrose Park, Ill., a corporation of Illinois
Filed Aug. 19, 1965, Ser. No. 480,995
3 Claims. (Cl. 211—177)

This invention relates to a frame for a merchandising fixture and to such a frame constructed of sections detachably joined together. More particularly, the invention relates to a sectional merchandiser frame in which the sections are detachably joined together by novel attachment joint structure including a spring latch.

Merchandising fixtures or devices constructed of detachably joined frame sections, for convertibility and adjustability, are in widespread use, and they are especially suitable for mass merchandising of wearing apparel and other soft goods. The fixtures may be assembled in various ways and in various sizes for displaying and/or storing a variety of goods while conforming to the layout of a store and the availability of space.

Previously, detachable merchandiser frame sections were constructed with attachment joints including keyhole slots in one section and interfitting key bars projecting from another section, the bars being received in the slots to interconnect the sections. Such prior structures have required precision work in forming the slots and in constructing and mounting the bars. The existence of play between the interfitting parts has enabled the keys to turn in the slots, and there has been a tendency of the frame sections to fold somewhat and be moved out of alignment. The frames also have had a tendency to rattle. The projecting joint parts in these prior devices have been subject to damage, and it has been inconvenient to repair or replace them, and tools are required for the work.

An important object of the present invention is to provide a merchandiser frame constructed of detachable frame sections which overcomes the aforesaid prior problems and provides other advantages over the prior structures.

Another object is to provide a merchandiser frame having sections detachably joined together at rigid joints, the tolerances of the joint parts being readily held during manufacture to avoid play between the parts.

An additional object is to provide merchandiser frame sections having attachment parts that facilitate rapid and convenient assembly and disassembly of the frame.

A further object of the invention is to provide merchandiser frame sections having attachment parts that are less susceptible to damage in shipment, handling and storage than prior devices and, in the event of damage to exposed parts, the parts may be readily replaced.

Another object is to provide an attachment joint structure for detachable merchandiser frame sections which securely holds the frame sections together, minimizes stress problems, requires relatively little precision work in its manufacture, and is relatively simple and economical to construct.

An accompanying object is to provide an attachment joint structure for such frame sections including a spring latch that serves to produce a tight secure joint and also may be removed and replaced rapidly and conveniently, without tools.

An additional object is to provide a merchandiser frame including upright frame sections detachably joined together by upper and lower joint structures including at least one structure as referred to above.

Still another object of the invention is to provide a merchandiser frame including an upright starter frame section and a plurality of additional upright frame sections detachably joinable to either end of the starter section and to each other, wherein an attachment joint structure, as referred to above, is provided for joining each section to another section.

These and other objects, advantages and functions of the invention will be apparent on reference to the following specification and the attached drawings illustrating preferred embodiments of the invention, wherein like parts are identified by like reference symbols in each of the views, and wherein:

FIGURE 1 is a perspective view of a merchandiser frame, of the gondola type, constructed according to the invention;

FIG. 2 is a fragmentary exploded perspective view of several of the sections of the frame illustrated in FIG. 1;

FIG. 3 is an enlarged side elevational view of a starter section of the frame assembly illustrated in FIG. 1;

FIG. 4 is a horizontal sectional view thereof, taken substantially along line 4—4 of FIG. 3;

FIG. 5 is an end elevational view thereof;

FIG. 6 is a fragmentary vertical sectional view thereof, taken along line 6—6 of FIG. 3;

FIG. 22 is a side elevational view, on a larger scale, of an end section of the garment rack frame illustrated in FIG. 17;

FIG. 23 is an end elevational view thereof;

FIG. 24 is a horizontal sectional view thereof, taken along line 24—24 of FIG. 22;

FIG. 25 is a bottom plan view thereof;

FIG. 26 is an enlarged fragmentary vertical sectional view thereof, taken substantially on line 26—26 of FIG. 22; and FIG. 27 is an enlarged fragmentary vertical sectional view of an upper attachment joint structure in the garment rack frame, taken substantially along the line 27—27 of FIG. 17.

Figure 7:
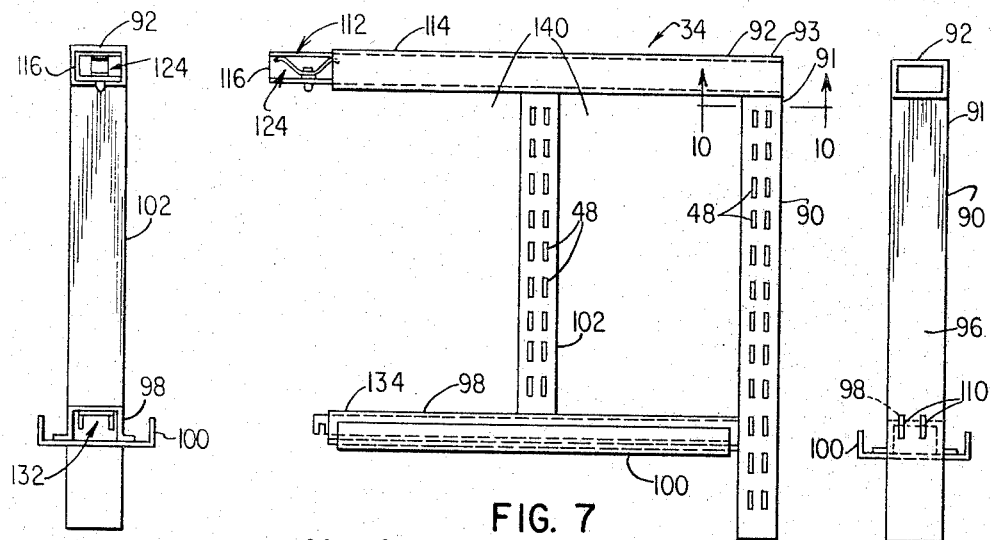
FIG. 7 is an enlarged side elevational view of an add-on section of the starter frame illustrated in FIG. 1.
Figure 8:
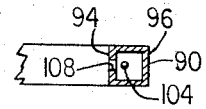
FIG. 8 is an elevational view of one end thereof.
Figure 9:
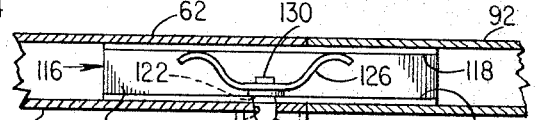
FIG. 9 is an elevational view of the opposite end thereof.
Figure 10:
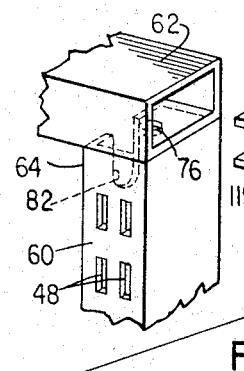
FIG. 10 is a fragmentary horizontal sectional view thereof, taken on line 10—10 of FIG. 7.

The invention provides a merchandiser frame constructed of sections detachably joined together, including an attachment joint structure comprising a tubular frame member forming part of one frame section, a connecting member fixed to an adjoining frame section and telescopically received within the frame member, means forming a latch opening in the frame member, and a spring latch mounted on the connecting member and received in the latch opening for joining the frame sections together.

In the drawings, FIGS. 1 and 2 illustrate a frame 30 for a gondola that may be used for the display and storage of soft goods. The frame is constructed for mounting drawer units, panels, shelves, hang rails, and other accessories thereon, as may be appropriate for the intended use.

The frame 30 includes an upright starter frame section 32 and an upright add-on frame section 34 having the attachment joint structure of the invention, together with additional frame parts for assembling a gondola. The additional parts include transverse horizontal support bars 36 on opposite ends of the frame assembly. The transverse bars 36 may have integral legs 38 at their outer ends and conventional hook-type attachment brackets 40 at their inner ends, the latter of which are connected to the starter and add-on sections. The outer ends of the transverse bars are joined by horizontal longitudinal support bars 42 having hook type brackets 44 and upwardly projecting mounting tabs 46 at their opposite ends. The starter and add-on sections 32 and 34 are provided with pairs of vertical elongated bracket-receiving slots 48 arranged in vertical rows on the sides thereof, and the brackets 40 on the transverse support bars 36 are received in lower pairs of such slots. The transverse support bars are provided with pairs of bracket-receiving slots 50 in horizontal rows adjacent their outer ends, and the brackets 44 on the longitudinal support bars are received in such slots.

The frame assembly may be completed by a pair of upright end sections 52 having attachment plates 54 thereon. The end sections, as illustrated, are secured to the outer ends of the respective starter and add-on frame sections 32 and 34, as by screws 56 which extend through the attachment plates 54 and into the outer end walls of the starter and add-sections. Conventional levelers 58 are mounted in the lower ends of the several legs of the frame assembly 30, and outer end openings in the starter and add-on sections may be closed by plugs or caps 59.

Referring to FIGS. 3 to 6, the starter frame section 32 includes a pair of spaced parallel vertical upright rectangular tubular end legs 60 and an upper horizontal rectangular tubular crossbar 62 secured thereto, with the upper ends 64 of the legs abutting the under side of the crossbar and welded or otherwise secured thereto. A lower horizontal rectangular inverted channel crossbar 66, having integral lower horizontal flanges 68 extending from opposite sides thereof, extends between the legs 60 in spaced parallel relation to the upper crossbar 62. The lower crossbar 66 abuts the legs at a location spaced above their lower ends. A horizontal mounting channel 70 is secured to the bottom of the lower crossbar 66 therealong and extends laterally therefrom. A vertical upright rectangular tubular center post 72 may extend between the upper crossbar 62 and the lower crossbar 66 and abut thereon, the center post being parallel to the legs 60 and spaced therebetween. The several parts of the starter section and the parts of the other frame sections described herein may be secured together as by welding or brazing, or by other suitable means.

Figure 11:
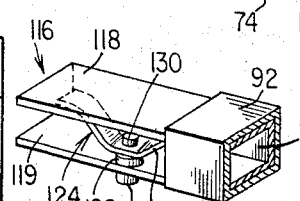
FIG. 11 is an enlarged fragmentary exploded perspective view of an upper attachment joint structure of the gondola frame, illustrating the complementary parts of the starter section and the add-on section.
Figure 12:
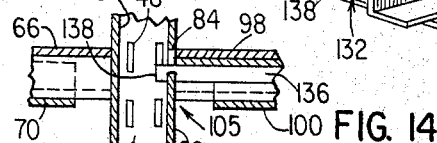
FIG. 12 is an enlarged fragmentary vertical sectional view of the upper joint structure, taken substantially on line 12—12 of FIG. 1.

The inner or lower wall 74 of the upper crossbar 62 which abuts on the upper ends 64 of the legs, is provided with circular latch openings 76 adjacent to and spaced from the respective ends of the crossbar 62 (see FIGS. 11 and 12). These openings register with the upper interiors of the respective abutting upper leg ends 64. Each leg 60 includes an inner wall 78 and an outer wall 80 facing in the axial direction of the crossbars 62 and 66, and an elongated access opening or slot 82 (FIGS. 11 and 12) is provided in the inner wall 78 of each leg 60 at its upper end 64. Two laterally spaced parallel aligned vertical elongated attachment slots 84 (FIG. 14) are provided in the outer wall of the leg 60 in alignment with the lower crossbar 66. The front and rear walls of the legs 60 and the corresponding walls 88 of the center post are provided with the bracket-receiving slots 48 referred to above.

Referring to FIGS. 7–14, the add-on section 34 includes a vertical upright rectangular tubular end leg 90 and an upper horizontal rectangular tubular crossbar 92. The leg and the upper crossbar are like the legs 60 and the upper crossbar 62, respectively, of the starter section 32. The upper end 91 of the leg abuts on one end 93 of the crossbar at a right angle, and the leg includes inner and outer walls 94 and 96 facing the axial direction of the crossbar. A lower horizontal rectangular inverted channel crossbar 98 is parallel to the upper crossbar and spaced therebelow. One end of the lower crossbar abuts on the leg at a right angle, adjacent to the lower end of the leg and spaced thereabove. The lower crossbar is like the lower crossbar 66 of the starter section and is similarly mounted. A horizontal mounting channel 100 is secured to the bottom of the lower crossbar 98, and it is like the mounting channel 70 on the starter section. A center post 102 extends between the upper and lower crossbars perpendicularly thereto, between the ends of the crossbars and in spaced parallel relation to the leg. The ends of the crossbars opposite to their ends abutting on the leg 90 are free, for attachment to the starter section or to another add-on section, to form respective upper and lower attachment joints 103 and 105 (FIG. 1).

A circular latch opening 104, like the latch openings 76 in the starter section upper crossbar 62, is provided in the inner wall 106 of the upper add-on section crossbar 92 which abuts on the leg 90, and the opening registers with the abutting end 91 of the leg. An access opening 108 is provided in the inner wall 94 of the leg at its abutting end, in like manner to the access opening 82 in each leg 60 of the starter section. Two spaced parallel vertical attachment slots 110 are provided in the outer wall 96 of the leg in alignment with the lower crossbar 98, in like manner to the attachment slots 84 in each leg 60 of the starter section. Bracket-receiving slots 48 are provided in the side walls of the leg and the center post in like manner to the slots bearing the same numbers in the starter section.

A spring latch connector 112 is mounted in the free end 114 of the add-on section upper crossbar 92 and projects therefrom. The connector includes a projecting horizontal connecting channel bar 116 having parallel horizontal side walls 118 and 119 integrally joined by a vertical web 120. The side walls and web of the channel bar have substantially the same external dimensions as the respective adjacent inner surfaces of the upper crossbar 92. The channel bar is secured in the crossbar by spot welding or other suitable means. The cross sectional dimensions of the starter section upper crossbar 62 are the same as those of the add-on section upper crossbar 92. The channel bar may be inserted in either end of the starter section upper crossbar, and it is telescopically received therein in close fitting engagement therewith to form the attachment joint 103. Likewise, the channel bar may be inserted in the opposite end 93 of another add-on section 34 to form an attachment joint.

A circular latch opening 122 is provided in the projecting portion of the lower side wall 119 of the channel bar 116. The channel bar latch opening registers with a latch opening 76 in the starter section upper crossbar 62 when the channel bar is received in either end of such crossbar and the upper crossbars 62 and 92 of the starter and add-on sections abut on each other, as illustrated in FIG. 12. Likewise, the channel bar latch opening 122 registers with the crossbar latch opening 104 of another add-on section when the channel bar is inserted within the opposite end 93 of the other section and the upper crossbars of the respective sections abut each other.

A spring latch or clip 124 is mounted in the channel bar 116. The latch includes a leaf spring 126 and a round-nosed cylindrical detent or bullet catch 128 having a rivet end 130. The rivet end extends through a corresponding opening in the center of the spring and secures the detent to the spring. The detent is inserted in the channel bar latch opening 122, and the latch is held captive between the side walls 118 and 119 of the channel bar. The web 120 prevents the spring from turning out of engagement with the upper wall 118. The latch may be removed by pushing the detent upwardly through the latch opening and then withdrawing the latch from between the side walls.

The detent 128 is closely received within the latch opening 122 of the channel bar 116. The detent also is closely received within either starter section crossbar latch opening 76 or the similar opening 104 of another add-on section when such opening registers with the channel bar latch opening, as illustrated in FIG. 12. The channel bar and the spring-pressed detent thereon thus serve to join two sections together tightly, without significant lateral or longitudinal play.

Figures 13, 14, 15:
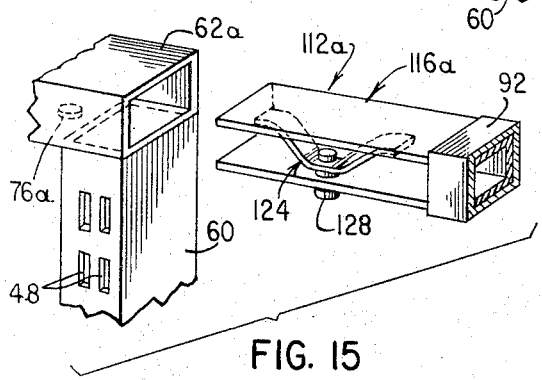
FIG. 13 is an enlarged fragmentary perspective view of a portion of the add-on section forming part of a lower attachment joint structure of the gondola frame.
FIG. 14 is an enlarged fragmentary vertical sectional view of the lower joint structure, taken substantially on line 14—14 of FIG. 1.
FIG. 15 is a view like FIG. 11, but showing an alternative embodiment of the upper joint structure.

A hook connector 132 is mounted in the free end 134 of the add-on section of the lower crossbar 98 and projects therefrom, The connector includes a channel portion 136 secured to the lower crossbar, and a projecting pair of vertically disposed integral attachment hooks 138. The hooks are received in the respective attachment slots 84 in the outer wall 80 of either starter frame section leg 60. As illustrated in FIG. 14, the hooks engage the outer wall 80 with the add-on section lower crossbar 98 abutting on the wall. The hooks are received in like manner in the attachment slots 110 in the leg 90 of another add-on section 34.

In assembling the gondola frame 30, the spring latch 124, if loose, is mounted in the channel bar 116, by compressing the spring 126 and inserting the detent 128 in the latch opening 122. In this connection, the spring latch may be removed from the channel bar for shipment and storage, thus protecting it from damage. Should the latch be damaged, it is readily replaced by another latch.

The spring latch connector 112 is inserted in the starter section upper crossbar 62, at either end as desired. The detent 128 is pushed up into the channel bar 116 sufficiently to permit the connector to be inserted. The free end 134 of the lower crossbar 98 of the add-on section is slightly bent upwardly, the bar having sufficiently flexibility for the purpose. The hooks 138 of the hook connector 132 are inserted in the attachment slots 84 in the leg 60 of the starter section, at the end in which the spring latch connector 112 is inserted. The add-on section upper and lower crossbars 92 and 98 are moved into abutting relation with the adjoining parts of the starter section 32, as illustrated in FIGS. 12 and 14, and the latch detent 128 and the attachment hooks 138 snap into engagement with the starter section. The detent is received in the latch opening 76 in the starter section upper crossbar 62, and the hooks engage the outer wall 80 of the starter section leg 60.

In this manner, the sections are joined together in alignment with relatively little play. The parts lend themselves to manufacture with close tolerances which are readily held. The attachment joint structures are strong and subject to minimal stresses, and they securely hold the frame sections together.

Additional add-on sections 34 may be attached in like manner to the other end of the starter section 32 and to the outer end of each attached add-on section, to whatever extent it may be desired to extend the frame. One add-on section is attached to another by inserting the spring latch connector 112 of one section into the opposite end 93 of the other section, and inserting the attachment hooks 138 into the attachment slots 110 on the leg 90 of the other section. The resulting attachment joints are like those formed with the starter section and have the same features.

Attached sections are detached by bending the free end 134 of the add-on section lower crossbar 98 upwardly and withdrawing the attachment hooks 138 from the attachment slots 84 or 110 in the leg 60 or 90 of the section to which the add-on section is attached. A finger or tool is inserted in the appropriate access opening 82 in a starter section 32, or in the access opening 108 in an add-on section 34, where the sections are joined together. The opening permits access to the detent 128, which is raised sufficiently to enable the channel bar 116 to be withdrawn from the upper crossbar 62 or 92 in which it is inserted.

The upper joint structure illustrated in FIGS. 2–12 is particularly adapted for use in a frame 30 in which panels subsequently are mounted in the spaces 140 between the legs 60 and 90, and the center posts 72 and 102. The detents 128 are enclosed within the upper ends of the legs and do not interfere with the mounting of the panels. At the same time, the detents are protected from abuse.

Figure 16:
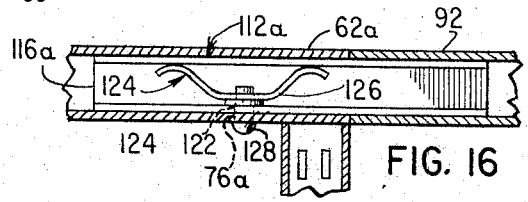
FIG. 16 is a view like FIG. 12, but illustrating the joint structure of FIG. 15.

FIGS. 15 and 16 illustrate an alternative upper joint structure for use when no problem is posed by the presence of panels or other structure in the spaces 140. In this structure, a circular latch opening 76a is provided in the wall 74a of the starter section crossbar 62a which abuts on the leg 60. The latch opening is spaced inwardly from the leg, rather than registering with the leg as does the latch opening 76 in the starter section upper crossbar 62 of the preceding embodiment. A connector 112a is secured in the free end 114 of the add-on section upper crossbar 92. The connector is constructed of a channel bar 116a which projects from the crossbar for a greater distance than the channel bar 116 of the preceding embodiment. The spring latch 124 is mounted in the channel bar in the same manner as in the preceding embodiment, so that its latch opening 122 registers with the starter section latch opening 76a, as illustrated in FIG. 16. The detent 128 is closely received within the registering openings to secure the sections together. The sections may be detached by pressing upwardly on the exposed end of the detent 128, until the connector 112a may be withdrawn from the starter section crossbar 62a.

The remainder of the gondola frame 30 is assembled as illustrated in FIGS. 1 and 2 and as described above. The transverse support bars 36 are attached to the lower ends of the legs 60 and 90 on their opposite sides by means of the attachment brackets 40. The longitudinal support bars 42 are attached to the outer ends of the transverse support bars 36 by means of the brackets 44. The end sections 52 are attached to the outer walls 80 and 96 of the respective legs 60 and 90 by means of the attachment plates 54 and the screws 56.

The gondola may be completed by mounting various conventional attachments and units on the frame 30. Thus, for example, appropriate panels may be mounted in the spaces 140 between the legs 60 and 90 and the center posts 72 and 102. Drawer frames may be mounted on the mounting channels 70 and 100 at the center of the frame, and on the mounting tabs 46 at the perimeter of the frame. Merchandise drawers are mounted on the drawer frames so installed. At the same time, or alternatively, shelves may be mounted on the sides of the legs and center posts, by means of conventional attachment brackets such as the brackets 40 on the transverse support bars. Hang rails may be mounted in a similar manner, or may be mounted on the end sections 52 to extend therebetween. These and numerous other arrangements may be selected to perform the desired display and storage functions, and the size of the fixture may be changed as well by adding or removing add-on sections 34.

In another embodiment of the invention, illustrated in FIGS. 17–27, a garment rack 150 includes a frame 152 constructed of sections detachably joined together. The frame includes an upright starter or center frame section 154 and two upright end sections 156. Two hang rails 158 are mounted on the end sections and extend therebetween.

Referring to FIGS. 18–21, the starter section 154 includes upper and lower spaced parallel horizontal rectangular tubular crossbars 160 and 162. Two end posts 164 and a center post 166 extend between the crossbars perpendicularly thereto. The posts have a rectangular tubular construction, and they secured to the crossbars in spaced parallel relation similarly to the legs and post of the prior embodiments. A vertical row of spaced bracket-receiving slots 168 is provided in each side wall of each of the posts, although more than one row may be provided if desired. The lower wall 170 of the upper crossbar 160 is provided with two circular latch openings 172, which are spaced inwardly from the end posts 164. The lower wall 174 of the lower crossbar 162 is also provided with two circular latch openings 176 in vertical alignment with the upper crossbar openings.

Referring to FIGS. 22–27, each end section 156 includes an upper horizontal crossbar 178 and two upright legs 180 perpendicular thereto at opposite ends of the crossbar. A lower horizontal crossbar 182 extends between the legs perpendicularly thereto, in spaced parallel relation to the upper crossbar. The crossbars and the legs have a rectangular tubular construction. A vertical row of bracket-receiving slots 184 is provided in an inner side wall of each of the legs.

Spring latch connectors 112b, like the connectors 112 and 112a of the preceding embodiments, are secured to the respective upper and lower crossbars 178 and 182 centrally thereof. The connectors project outwardly from the inner side of the end section horizontally in vertically aligned parallel relation. Each connector 112b includes a connecting channel bar 116b having a latch opening 122 in one wall thereof, and the spring latch 124 is mounted therein as in the preceding embodiments.

Figure 17:
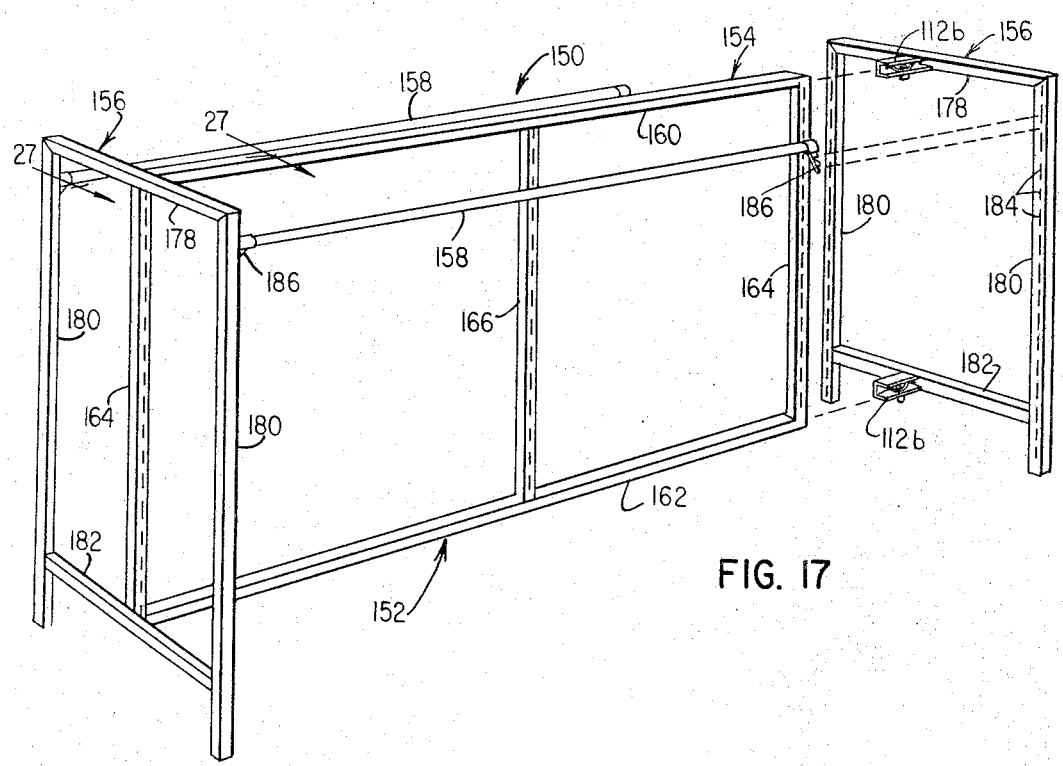
FIG. 17 is an exploded perspective view of a garment rack constructed according to the invention.
Figure 18:
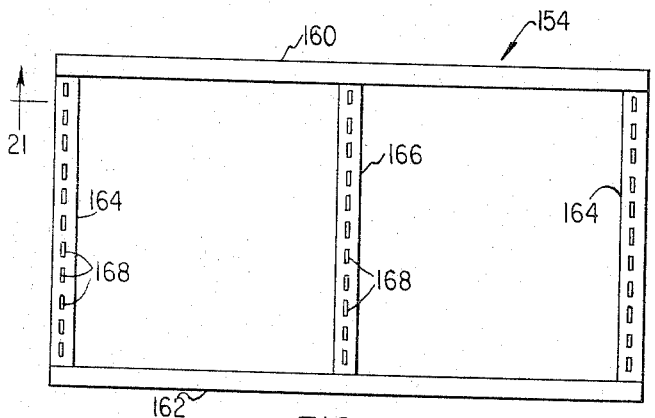
FIG. 18 is a side elevational view, on a smaller scale, of the starter or center section of the garment rack frame illustrated in FIG. 17.
Figure 19:
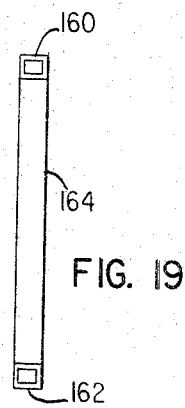
FIG. 19 is an end elevational view thereof.
Figure 20:
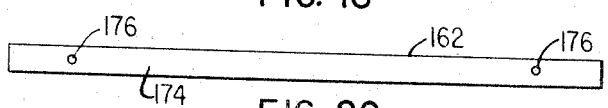
FIG. 20 is a bottom plan view thereof.
Figure 21:
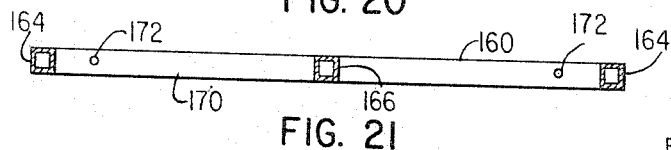
FIG. 21 is a horizontal sectional view thereof, taken along line 21—21 of FIG. 18.

The connectors 112b are received within the upper and lower crossbars 160 and 162 of the starter section 154 at either end thereof, as illustrated in FIGS. 17 and 27. When the connectors are inserted until the end section crossbars 178 and 182 abut on the respective starter section crossbars 160 and 162, the connector latch openings 122 register with the respective crossbar latch openings 172 and 176. The detents 128 are closely received within the registering pairs of latch openings, to secure the sections together. The sections are detached by pressing the exposed ends of the detents upwardly until the connectors can be withdrawn from the crossbars.

The garment rack frame 152 is assembled by attaching one end section 156 to each end of the starter section 154, in the foregoing manner. The garment rack is completed by attaching the hang rails 158 to the legs 180 of the end sections. The hang rails are provided with conventional brackets 186 having hooks thereon, there being one bracket at each end of each hang rail. The hooks are received in the slots 184 in the end section legs. If desired, additional hang rails may be mounted on the end sections in like manner. Other items and accessories may be mounted on the frame, such as end and center panels. The slots 168 in the starter section posts are used for mounting other accessories, by means of brackets thereon.

The frames constructed according to the invention thus are assembled readily with the sections snapping together at the joints. No bolts or screws need be tightened or loosened in attaching and detaching the sections. The joints are strong and rigid. The joint structures prevent the sections from being pulled apart unintentionally while affording convenient disassembly of the frame.

While certain preferred embodiments of the invention have been illustrated and described, it will be apparent that various changes and modifications may be made therein within the spirit and scope of the invention. It is intended that such changes and modifications be included within the scope of the appended claims.

We claim:

1. In a merchandiser frame constructed of sections detachably joined together, an attachment joint structure which comprises angularly adjoining first and second tubular frame members forming parts of one frame section, one of said frame members having an end abutting on a wall of the remaining frame member, a hollow connecting member fixed to an adjoining frame section and telescopically received within said remaining frame member, a latch mounted in said connecting member and including a spring and a detent thereon, means forming an opening in a wall of said connecting member closely receiving said detent therein, means forming an opening in said wall of said remaining frame member registering with said first-named opening and closely receiving said detent therein for joining said frame sections together, said first and second-named openings registering with said abutting end of said one frame member for receiving said detent within the end, and means forming an opening in a wall of said one frame member permitting access to said detent for detaching said frame sections from each other.

2. A merchandiser frame including an upright starter section and an additional upright section detachably joinable to either end of said starter section, said starter section including a horizontal tubular crossbar extending between opposite ends of the section, means forming a latch opening in said crossbar adjacent each end thereof, a horizontal connecting bar fixed to said additional section and telescopically receivable within said crossbar at either end thereof, and a spring latch mounted in said connecting bar and receivable in either of said latch openings for joining said sections together.

3. A merchandiser frame including an upright starter section and a plurality of additional upright sections detachably joinable to either end of said starter section and to each other, said starter section including a horizontal rectangular tubular crossbar extending between opposite ends of the section and a pair of upright rectangular tubular legs adjacent opposite ends of the crossbar, the upper ends of said legs abutting on a wall of said crossbar with one wall of each leg facing outwardly in the axial direction of the crossbar, means forming an opening in said crossbar wall adjacent each end thereof and registering with said abutting end of said leg thereat, means forming an access opening in a wall of each of said legs adjacent said abutting end thereof, means forming a laterally spaced pair of parallel vertical slots in said outwardly facing wall of each leg and spaced from said abutting end thereof, said additional sections each including a horizontal rectangular tubular crossbar extending between opposite ends of the sections and an upright rectangular tubular leg adjacent one end of the crossbar, the upper end of each of said additional section legs abutting on a wall of said crossbar of the additional section with one wall of the leg facing outwardly in the axial direction of the crossbar, means forming an opening in a wall of each of said additional section crossbars adjacent said one end thereof and registering with said abutting end of said leg thereat, means forming an access opening in a wall of each of said additional section legs adjacent said abutting end thereof, means forming a laterally spaced pair of parallel vertical slots in said outwardly facing wall of each of said additional section legs and spaced from said abutting end thereof, a horizontal rectangular connecting channel member fixed within each of said additional section crossbars at the end thereof opposite said one end, said channel member on each additional section projecting from the crossbar thereof and being telescopically receivable within said starter section crossbar at either end thereof and likewise within the crossbar of another additional section at said one end thereof, a latch mounted in each of said channel members and including a spring and a detent thereon, means forming an opening in one of the opposed side walls of each of said channel members closely receiving said detent thereon, each of said latches being held captive between said side walls of its channel member and being removable therefrom by removing said detent from said channel member opening, each of said starter section crossbar openings and said additional section crossbar openings registering with said opening in the channel member of another additional section when such channel member is received in the corresponding end of one of said crossbars and closely receiving said detent therein for joining said sections together at an upper joint, said access openings permitting access to said detent for detaching said sections from each other, and a pair of hooks fixed to the free end of a lower crossbar connected to each of said additional sections and removably receivable in said pair of slots respectively at either end of said starter section correspondingly to said channel member and likewise in said pair of slots in another additional section for joining said sections together at a lower joint.

References Cited
UNITED STATES PATENTS

| | | | |
|---|---|---|---|
| 2,594,605 | 4/1952 | Zoppelt. | |
| 2,596,850 | 5/1952 | Griffin. | |
| 2,963,173 | 12/1960 | Barnes | 211—177 |
| 3,021,961 | 2/1962 | Ruhnke | 211—177 |
| 3,092,408 | 6/1963 | Berman | 211—182 X |
| 3,217,449 | 11/1965 | Levere | 211—182 X |
| 3,246,768 | 4/1966 | Carlos | 211—178 |

ROY D. FRAZIER, *Primary Examiner.*

CLAUDE A. LEROY, *Examiner.*

W. D. LOULAN, *Assistant Examiner.*